US006636810B1

(12) United States Patent
Moore et al.

(10) Patent No.: US 6,636,810 B1
(45) Date of Patent: Oct. 21, 2003

(54) HIGH-RESOLUTION RADON TRANSFORM FOR PROCESSING SEISMIC DATA

(75) Inventors: Ian Moore, Shelley (AU); Clement Kostov, Katy, TX (US); David Yingst, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/165,439

(22) Filed: Jun. 7, 2002

Related U.S. Application Data

(60) Provisional application No. 60/383,209, filed on May 24, 2002.

(51) Int. Cl.$^7$ ................................................. G01V 1/28

(52) U.S. Cl. ....................................................... 702/17

(58) Field of Search ............................. 702/14, 17, 18; 367/73

(56) References Cited

U.S. PATENT DOCUMENTS

| | | | |
|---|---|---|---|
| 4,760,563 A | 7/1988 | Beylkin ........................ | 367/73 |
| 5,970,023 A | * 10/1999 | Chambers et al. ............ | 367/63 |
| 6,018,500 A | * 1/2000 | Chambers ..................... | 367/73 |
| 6,094,620 A | * 7/2000 | Gasparotto et al. ........... | 702/14 |

OTHER PUBLICATIONS

Beylkin, G., 1985, The Inversion Problem and Applications of the Generalized Radon Transform, Commun. Pure Appl. Math, vol 37, pp 579–599.

Beylkin, G., 1987, Discrete Radon Transform, IEEE Trans Acoust, Speech, Signal Processing, ASSP–35, pp 162–172.

Deans, S.R., 1993, The Radon Transform and Some of Its Applications, Krieger Publishing Company, p. 1–5.

Haldorsen, J.B.U., Miller, D.E., Walsh, J.J. and Zoch, H.–J., 1992, A Multichannel Approach to Signature Estimation and Deconvolution for Drill Bit Imaging, $62^{nd}$ Ann. Internat. Mtg: Soc. Of Expl. Geophys., pp 181–184.

Hampson, D., 1986, Inverse Velocity Stacking for Multiple Elimination, $56^{th}$ Ann. Internat. Mtg.: Soc. Of Expl. Geophys., Session:S6.7, p. 422–424.

Harlan, W.S., Claerbout, J.F. and Rocca, F., 1984, Signal/ Noise Separation and Velocity Estimation: Geophysics, Soc. Of Expl. Geophys., 49, pp 1869–1880.

Herrmann, P., Mojesky, T., Magesan, M. and Hugonnet, P., 2000, De–aliased, High–Resolution Radon Transforms, $70^{th}$ Ann. Internat. Mtg: Soc. Of Expl. Geophys., pp 1953–1956.

Hugonnet, P. and Canada, G., 1995, Aliasing in the parabolic Radon Transform, $65^{th}$ Ann. Internat. Mtg: Soc. Of Expl. Geophys., pp 1366–1369.

Hugonnet, P., Herrmann, P., Ribeiro, C., 2001, High–Resolution Radon: a review, $63^{rd}$ Ann. Internat. Mtg. EAGE.

Manin, M. and Spitz, S., 1995, Wavefield De–Aliasing for Acquisition Configurations Leading to Coarse Sampling, $65^{th}$ Ann. Internat. Mtg: Soc. Of Expl. Geophys., pp 930–932.

(List continued on next page.)

Primary Examiner—Donald E. McElheny, Jr.
(74) Attorney, Agent, or Firm—David S. Figatner; Williams, Morgan & Amerson, P.C.

(57) ABSTRACT

A method and computer system of processing seismic data is presented. A high-resolution Radon transform is defined for use on seismic data. The high-resolution Radon transform is regularized using a semblance measure of the seismic data. The seismic data is processed using the high-resolution Radon transform to enhance desirable features of the seismic data. A tangible representation of the processed seismic data is presented. The semblance measure of the seismic can include a semblance measure along a dimension of the seismic data.

20 Claims, 17 Drawing Sheets

OTHER PUBLICATIONS

Marfurt, K.J., Schneider, R.V. and Mueller, M.C., 1996, Pitfalls of using Conventional and Discrete Radon Transforms on Poorly Sample Data: Geophysics, Soc. of Expl. Geophys., 61, pp 1467–1482.

Marple, S.L., 1987, Digital Spectral Analysis with Applications, Prentice Hall.

Nichols, D., 1992a, Dealiasing Bandlimited Data Using a Spectral Continuity Constraint, Stanford Exploration Project, vol. 73, pp 161–184.

Nichols, D., 1992b, Dealiasing Band-Limited Data Using a Spectral Continuity Constraint, $62^{nd}$ Ann. Internat. Mtg: Soc. of Expl. Geophys., pp 1183–1186.

Sacchi, M.D. and Ulrych, T.J., 1995, High-Resolution Velocity Gathers and Offset Space Reconstruction: Geophysics, Soc. of Expl. Geophys., 60, pp 1169–1177.

Sacchi, M.D., 1999, Fast, High Resolution Parabolic Radon Transform, SEG Expanded Abstracts.

Schonewille, M.A. and Duijndam, A.J.W., 2001, Parabolic Radon Transform, Sampling and Efficiency: Geophysics, Soc. of Expl. Geophys., 66, pp 667–678.

Tarantola, A., 1987, Inverse Problem Theory, Elsevier, p. 68–70.

Thorson, J.R., Claerbout, J.F., 1985, Velocity-Stack and Slant-Stack Stochastic Inversion: Geophysics, 50, pp 2727–2741.

Ulrych, T.J., Sacchi, M.D. and Graul, J.M., 1999, Signal and Noise Separation: Art and Science: Geophysics, Soc. of Expl. Geophys., 64, pp 1648–1672.

* cited by examiner

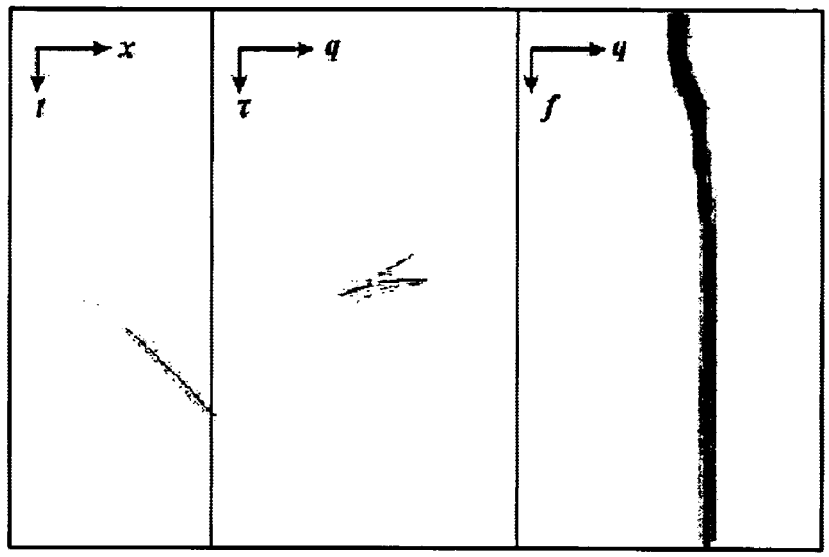
FIG. 7A  FIG. 7B  FIG. 7C
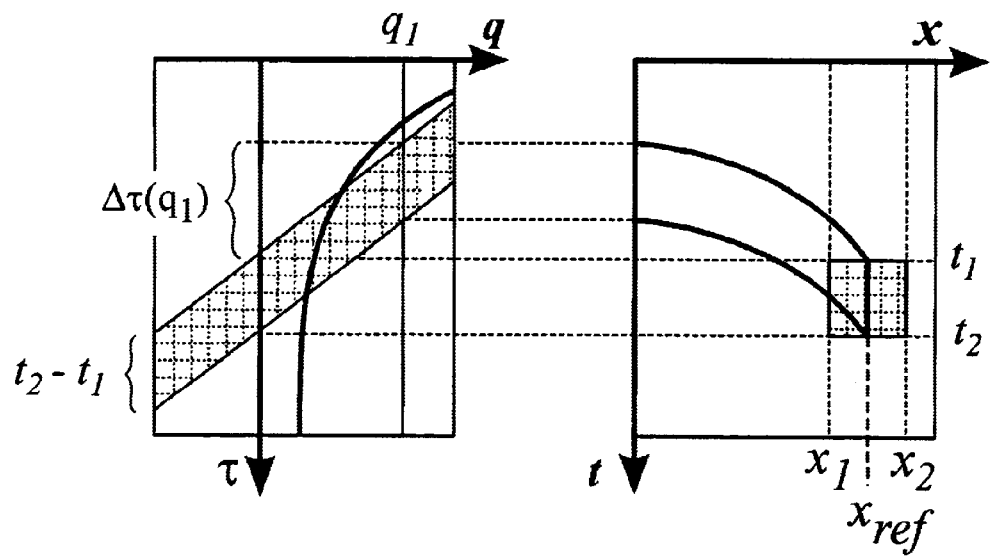
FIG. 8A  FIG. 8B

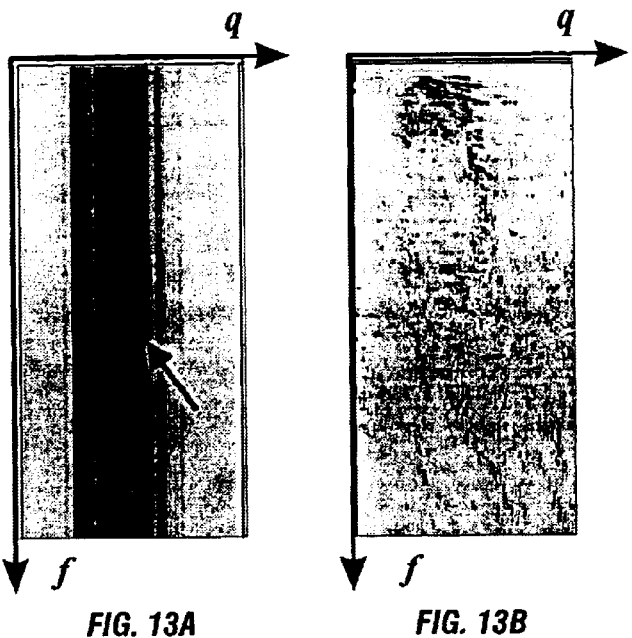
FIG. 13A  FIG. 13B
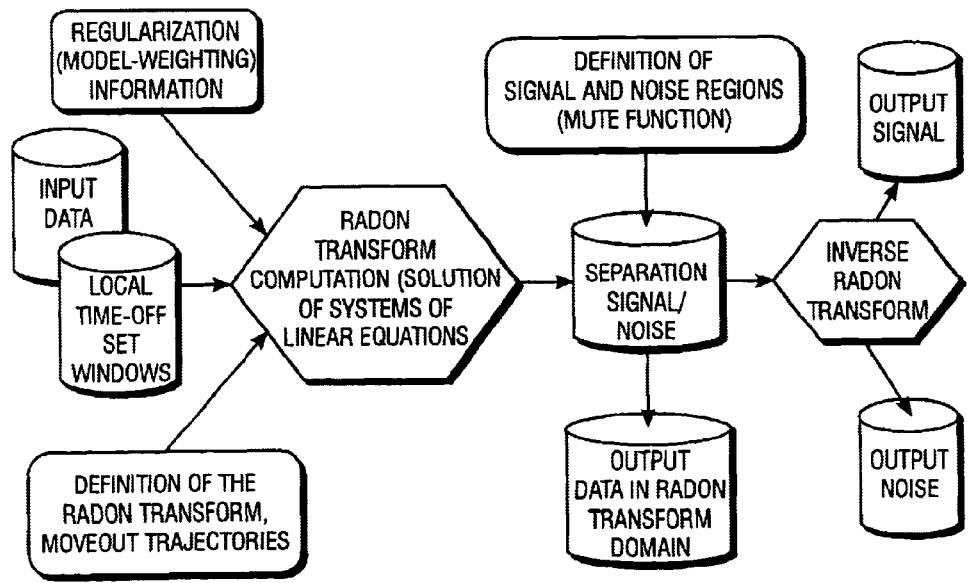
FIG. 14

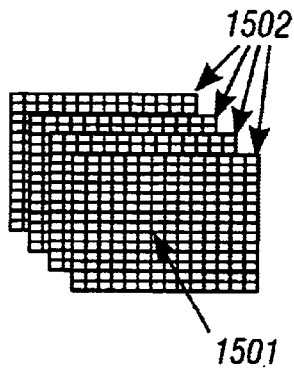 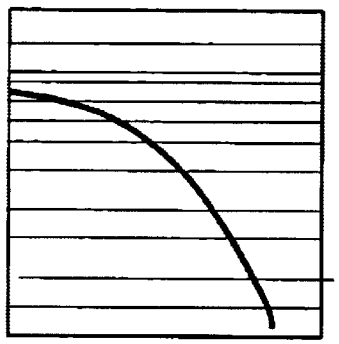 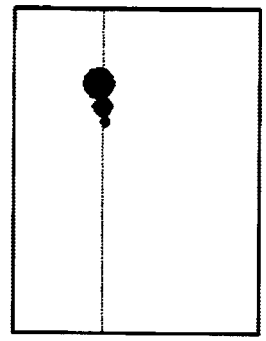
*FIG. 15A*     *FIG. 15B*     *FIG. 15C*
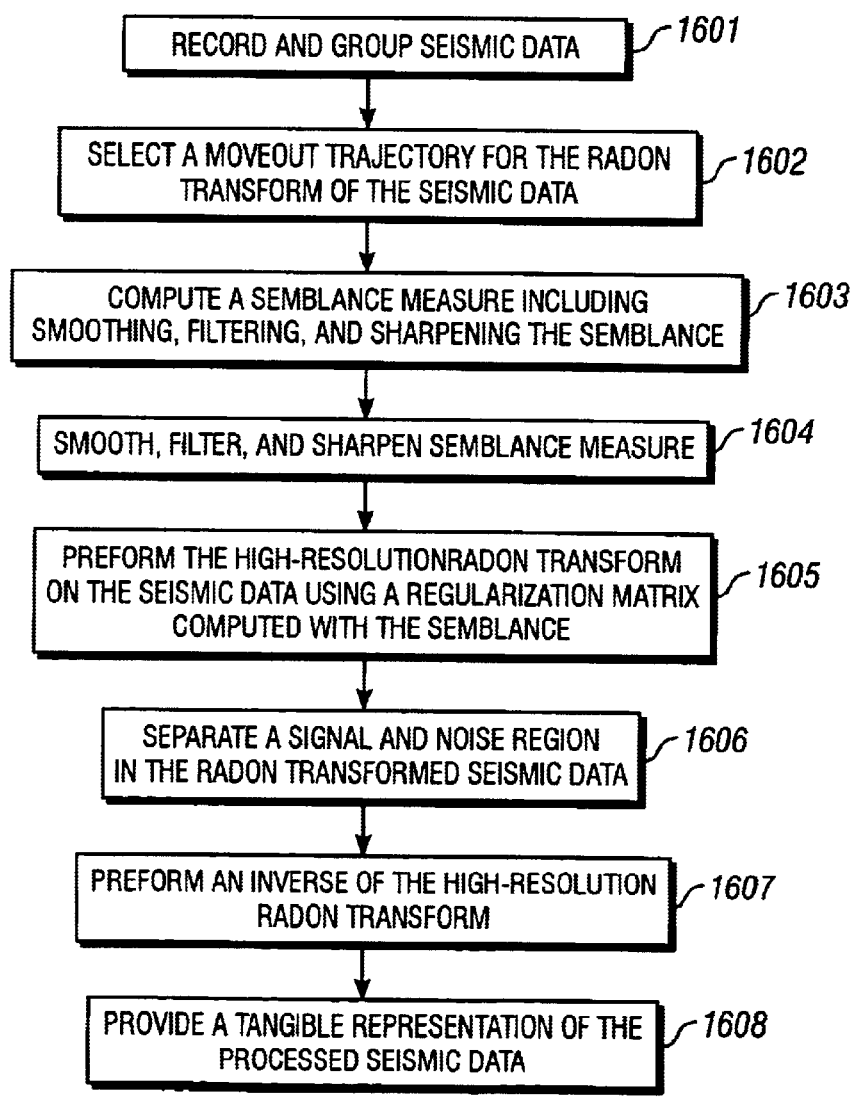
*FIG. 16*

HIGH-RESOLUTION RADON TRANSFORM FOR PROCESSING SEISMIC DATA

This patent application claims priority from U.S. Provisional Patent Application, Ser. No. 60/383,209, entitled, "High Resolution Radon Transform for Processing Data," and filed May 24, 2002.

FIELD OF INVENTION

This invention relates to the computation of high-resolution Radon transforms used in the processing of seismic data.

BACKGROUND

Radon transforms, along with Fourier and several other transforms, are part of the tools available to geophysicists for modeling and analysis of seismic signals. In geophysics and in other application areas, improved Radon transforms have been obtained by overcoming limitations due to the sampling and noise content of the data.

The earliest Radon transforms used in geophysics are simply discrete versions of results derived for continuous functions sampled over a large interval. The discrete Radon transform algorithms introduced later (Beylkin, 1987, Hampson, 1986) provide exactly invertible transforms for discretely sampled, aperture-limited data. These transforms, now referred to as conventional, are effective at separating signal and noise provided that the input data and their line integrals (i.e., data in the Radon transform domain) are sampled without aliasing. In practice, processing of aliased-input data is an important issue, and improvements to current practice have been pursued by two approaches.

The first approach consists of deriving sampling requirements on conventional Radon transforms (Schonewille and Duijndam, 2001, Hugonnet and Canadas, 1995, Marfurt, 1996), and meeting these requirements through data acquisition, data interpolation, and pre-processing (Manin and Spitz, 1995).

In the second approach, prior information about the parts of the data that are aliased is included in the computation of the Radon transform. In its simplest form, prior information is introduced as a diagonal regularization term in the least-squares solution for the Radon transform. When all values along the diagonal are equal, the resulting solutions do not in general resolve ambiguities due to aliased input data. Nichols (1992a, 1992b), Herrmann et al. (2000), and Hugonnet (2001) have demonstrated that appropriate diagonal regularization produce accurate and efficient Radon transforms even when the input data are aliased.

Within the framework of Bayesian estimation, the diagonal regularization can be interpreted as assigning Gaussian prior distributions to the transform parameters, which are also assumed to be statistically independent (Tarantola, 1987, Ulrych et al., 2001). Other algorithms require less prior information by avoiding the assumption of Gaussian distributions, but tend to be computationally more complex (Sacchi and Ulrych, 1995, Harlan et al., 1984, Thorson and Claerbout, 1985).

Prior art on diagonal regularization in the computation of the high-resolution Radon transforms include the methods described by Nichols (1992a), Herrmann et al. (2000), and Hugonnet et al. (2001). In these cases, for reasons of computational efficiency, the transform is usually applied in the space-frequency domain with frequency-dependent diagonal regularization. The regularization term, however, is not updated as a function of the computed Radon transform.

Nichols (1992a) derives the regularization weights from a semblance measure along the temporal frequency axis of the data. The semblance for non-aliased seismic energy is usually varying slowly with frequency. Conversely, strong, short scale variations in the semblance are often used to identify aliased energy. To derive the weights, Nichols (1992a) discloses the smoothing of the semblance over a frequency interval containing frequencies that are lower and higher than the frequency being processed.

Herrmann (2000) and Hugonnet (2001) derive weights recursively in frequency, starting from a conventional Radon transform at the lowest frequency. The weights for a frequency being processed are built from the results of the high-resolution Radon transform at lower frequencies.

The examples in FIGS. 2, 3, and 4 illustrate Radon transforms computed with different prior art regularization schemes. FIGS. 2A–2D correspond to a conventional Radon transform regularized with a scalar multiplied by the identity matrix. In FIGS. 3A–3D, the regularization weights are variable terms along the diagonal, and the corresponding solution has higher resolution. In FIG. 4 however, we see that the same regularization scheme applied to noise-contaminated data produces a sub-optimal result.

The weights in FIG. 4E do not detect the parabolic events at low and high frequencies. The weights indicate reliably the moveouts in the data only above 15 Hz, while in the noise-free case as shown in FIG. 3E, the moveouts are detected from about 5 Hz. The weights in FIG. 4E also have spuriously high values at the edges of the transform domain, possibly an artifact due to starting the transform from a conventional Radon transform (i.e., equal weights). These high values generate strong artifacts in the data domain.

SUMMARY OF THE INVENTION

A new method for deriving regularization weights for the computation of high-resolution Radon transforms is described.

In one embodiment of the invention, a method of processing seismic data is presented. A high-resolution Radon transform is defined for use on seismic data. The high-resolution Radon transform is regularized using a semblance measure of the seismic data. The seismic data is processed using the high-resolution Radon transform to enhance desirable features of the seismic data. A tangible representation of the processed seismic data is presented.

The semblance measure of the seismic can include a semblance measure along a dimension of the seismic data. The seismic data can be divided into a two-dimensional array, which includes one dimension of time or depth, and a second dimension of a spatial surface position or an angle. The seismic data can also be divided into a multi-dimensional array including one dimension including time or depth, and the other dimensions selected from spatial surface positions and angles.

The processing of the seismic data can include performing the high-resolution Radon transform on the seismic data using the semblance measure of the seismic data. The first region and a second region in the Radon transformed seismic data can be separated. An inverse of the high-resolution Radon transform on the separated, Radon transformed seismic data can be performed.

The first region can be a signal region and the second region can be a noise region. The dimensions of the seismic data can include multiple dimensions of the seismic data. The dimension of the seismic data can also include a frequency domain.

In another embodiment, the processing of the seismic data using the high-resolution Radon transform to enhance desirable features of the seismic data can further include approximating a complex moveout trajectory by segments. The seismic data can be divided into local windows of data consistent with the segments. The high-resolution Radon transform can be performed on each of the local windows of data to enhance the desirable features of the seismic data consistent with the segments. Performing the high-resolution Radon transform on each of the local windows of data can include the steps of computing the transform with periodic boundary conditions and applying the signal-and-noise separation consistent with zero-value boundary conditions by using the known timeshifts between components of the model.

Regularizing the high-resolution Radon transform using a semblance measure of the seismic data can include computing a regularization matrix, which includes applying a phase shift determined by a moveout trajectory to the seismic data. It can also include normalizing the stack power along the moveout trajectory to obtain a semblance measure. It can also include sharpening the semblance measure or smoothing the semblance measure over a second dimension of the seismic data. The second dimension of the seismic data can include a dimension selected from a spatial position and an angle.

In another embodiment, the invention can be implemented on a computer system, where the computer includes a memory and a processor, and executable software residing in the computer memory. The software is operative with the processor to define a high-resolution Radon transform for use on seismic data. The high-resolution Radon transform is regularized using a semblance measure of the seismic data. The seismic data is processed using the high-resolution Radon transform to enhance desirable features of the seismic data.

The software can also provide for the performance of the high-resolution Radon transform on the seismic data using the semblance measure of the seismic data. A first region and a second region can be separated in the Radon transformed seismic data. An inverse of the high-resolution Radon transform on the separated, Radon transformed seismic data can be used.

The software can also include approximating a complex moveout trajectory by segments. The seismic data can be divided into a local windows of data consistent with the segments. A high-resolution Radon transform can be performed on each of the local windows of data to enhance the desirable features of the seismic data consistent with the plurality of segments.

The proposed method may retain the resolution and dealiasing qualities associated with high-resolution Radon transforms, and most of the efficiency associated with Nichols' and Herrmann's methods, but can be more stable than Herrrnann's method and can provide better resolution than Nichols' method.

Other features and advantages of the invention will be further understood in view of the following description.

BRIEF DESCRIPTION OF THE FIGURES

FIG. 7: Poor focusing and transform artifacts associated with processing a hyperbolic event, using one global data window and a parabolic Radon transform. (A) Residual. (B) Data in the parabolic Radon transform domain. (C) Weights used for the high-resolution Radon transform.

FIG. 8: Diagram illustrating the mapping of a local time-offset window into the parabolic Radon transform domain.

FIG. 13: Comparison of the weights: (13A, left) semblance-based method, and (13B, right) recursive method.

FIG. 14: Flowchart of the Radon Transform method.

FIG. 15: (A) Data sections, with schematic indication of local data windows within each section, prepared for input to a 2D Radon transform. (B) Schematic representation of a seismic data event (curved shape) and moveout trajectories (straight lines) for a Radon transform. (C) Schematic representation of Radon transform domain. After summation along straight lines, a vertical line in the transform domain will be filled in, and most of the energy will be contributed from the moveout trajectories, which are tangent to the seismic event.

FIG. 16: Flowchart for method of processing seismic data.

DETAILED DESCRIPTION

Figure 1A:
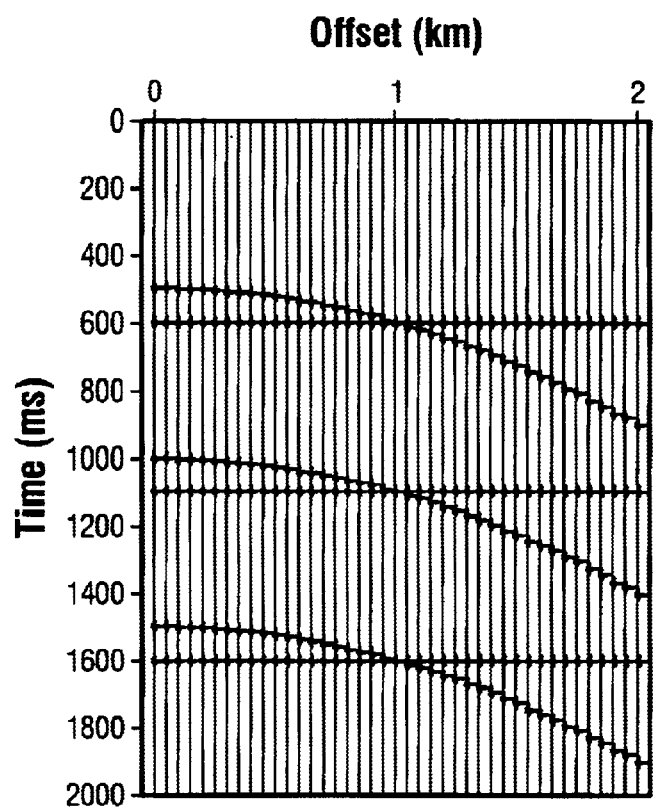
FIG. 1: (A) Synthetic test data containing parabolic events with 0 and 400 ms moveout, at maximum offset of 2000 m. (B) Same dataset with random noise added.

The present invention introduces a new scheme for computing a regularized, high-resolution Radon transform.

Referring to FIG. 16, seismic data is recorded using industry standard methods and grouped according to common surface (e.g., CMP gather), or sub-surface position (e.g., angle gathers formed during migration) 1601. FIG.

15A shows a 2D array 1502 created by grouping with one dimension as time or depth, and the other dimension as spatial position (offset) or angle. The time or depth dimension is usually sampled densely and is not aliased, whereas aliasing may occur due to insufficient sampling along the spatial position (offset) or angle dimension of the data. In other embodiments, different types of grouping may create three-dimensional or higher arrays for processing.

To transform the data, moveout trajectories for the Radon transform are selected using the moveout of the events in the data and considerations of computational efficiency 1602. Common choices of moveout trajectories are linear and parabolic ones as shown in FIGS. 15B and 15C. Other moveout trajectories, such as hyperbolic or more complex trajectories, may also be chosen.

During the Radon transform, the data are transformed to the frequency domain over the well-sampled dimension (time or depth) 1605. The vector of input data for the Radon transform at frequency $\omega$ is denoted by $d(x,\omega)$, in short d. The data are indexed by space locations, x, often represented as the distance (offset) between the source and receiver. The data vector d may represent data from an entire gather or from a local (time-offset) window of the data 1501, shown in FIG. 15A. Specific issues related to processing in local windows of data are discussed below in the section entitled, Criteria for Separating Signal and Noise in Local Windows of Data.

The result of the Radon transform at a frequency $\omega$, is a vector $m(q,\omega)$, or in short m, also called a model vector. The elements of m are indexed by parameters q defining the selected moveout trajectories of the Radon transform. In the case of a parabolic Radon transform, the parameters q are interpreted as curvatures of parabolas at zero offset. Usually the data input to the transform are 2D sections. The description of the Radon transform methods used in some embodiments of the present invention, however, are applicable to higher dimensional data, in which case the curvature parameters are no longer scalars, but vectors.

The Radon transform is a linear transform relating the data and model vectors. The relation between the model and the data vectors can be expressed in matrix form via Equation 1 (Beylkin, 1987):

$$d = Am \quad \text{Equation (1),}$$

where A is a matrix of size (M,N), M is the number of elements (complex scalars) in the data vector d, and N is the number of elements in the model vector m.

The Radon transform can be defined as a solution to the system of linear equations given in Equation (1). To ensure that the system of linear Equation (1) has a unique and stable solution, it is usual to define an objective function, J(m), associated with Equation (1), which is the sum of a regularization term and a data fitting term:

$$J(m) = m^H W^{-1} m + (d-Am)^H (d-Am) \quad \text{Equation (2),}$$

where superscript H denotes the conjugate transpose of a vector or matrix, and $W^{-1}$ is a regularization matrix.

The most common choice for $W^{-1}$ is a diagonal matrix with constant elements along the diagonal, e.g. $W^{-1} = \alpha I$, where I is the N×N identity matrix. This choice of regularization is associated with the conventional Radon transforms and is called "damped least squares." It provides a stable solution, but requires non-aliased, large aperture input data.

In one embodiment of the current invention, the regularization weights are derived by computing a semblance measure along the offset axis 1603:

$$S(p,\omega) = |A^H(p,\omega)d(\omega)|^\alpha / (|d(\omega)|^\alpha + \epsilon(\omega)) \quad \text{Equation (3),}$$

where $A^H$ is the conjugate-transpose matrix-of A; the data vector $d(\omega)$ may contain data from an entire gather, or from a local time-offset window of the gather; $\alpha$ is a coefficient which is used to sharpen the semblance; and $\epsilon$ is a stabilization and/or normalization factor. The conjugate-transpose of matrix of A is defined in terms of the moveout trajectories and applies appropriate phase shifts to the data.

The semblance measure can then be smoothed over a frequency range using a standard weighted average scheme (Marple, 1987), whereby the elements of the diagonal weight matrix W are computed as:

$$W(p,\omega_0) = \Sigma_k S(p,\omega_k) / \Sigma_k \alpha_k \quad \text{Equation (4),}$$

where the coefficients $\alpha_k$ depend on the number of frequencies being used for the smoothing, and not on the actual frequency values of $\omega_0$, $\omega_1$, etc. Common choices for the coefficients $\alpha_k$ are constant, triangular, and Gaussian weights. The range of frequencies over which the semblance measure is smoothed is preferably broadband and includes high frequencies. Other types of smoothing functions known to those in the art may be used to derive the diagonal weight matrix based on the semblance.

In addition, similar to standard practice in seismic data processing, the semblance measure may be filtered to improve stability by spatial averaging over a small number of neighbouring CMP locations, or by rejecting semblance values lower than a threshold value.

Once the seismic data has been transformed using the high-resolution Radon transform, the signal and noise regions of the transformed data can be separated (also known as muting) 1605. Methods to separate these regions are known in the art. The simplest method is to manually select a dividing geometry (mute function) between the signal and noise regions and remove data on one side of the geometry. If the seismic data is separated into local windows, then the muting can be accomplished through the method described in the section entitled, Efficient Implementation of the Signal-and-Noise Separation (muting) for the Transforms from Local Data Windows.

Once the noise has been muted, the seismic data is retransformed using an inverse high-resolution Radon transform 1607. The seismic data can then be represented in a tangible representation, such as a computer printout or display, or processed further before being displayed or presented to a user 1608.

In different embodiments of this invention, a software in a computer or computer system can be used to implement the High Resolution Radon transform as is presented in this invention and known in the art.

Criteria for Separating Signal and Noise in Local Windows of Data

The parabolic Radon transform relies on events in the data having a parabolic moveout, and constant amplitude, after NMO correction. In practice, however, the moveout trajectories in the data are complex and not necessarily parabolic. In another embodiment of this invention, a complex moveout trajectory can be well approximated by a combination of local segments of parabolas. The discussion below refers to parabolas, but applies to any of the segments commonly used in the Radon transforms.

Local windows of data are defined by dividing each dimension of the data into segments that cover the whole range for that dimension. A parabolic Radon transform can be applied to the data in each of the local windows. When applying the parabolic Radon transform in each local window, the assumptions of parabolic moveout and constant amplitude are better satisfied than over the entire range for that dimension. Unlike the conventional Radon transform, the high-resolution parabolic Radon transform enables the separation of the signal from noise data in the local window. Using the segments of parabolas that approximate the complex trajectory well over a local window, signal and noise separation can be expressed effectively in terms of the complex moveout trajectory. By modeling complex moveout trajectories, the criterion for selecting desirable features in the data can be more effective.

FIG. 7 illustrates a seismic event with residual hyperbolic moveout that is not well focused for a parabolic Radon transform computed over the entire offset range. When splitting the offset range in three parts and computing the parabolic Radon transform over each part separately, each of the transforms is well focused as is shown in FIG. 9.

Figures 9A, 9B, 9C, 9D, 9E, 9F, 9G:
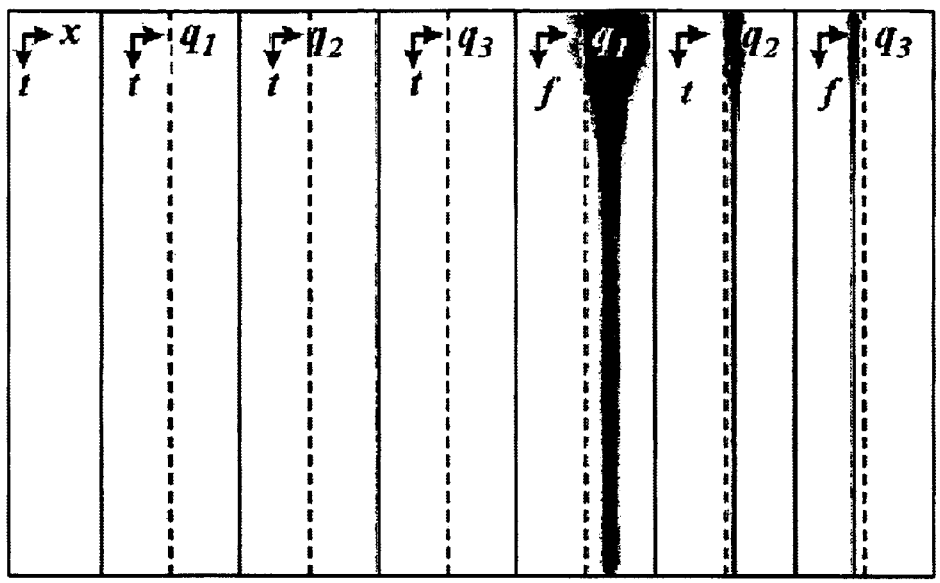
FIG. 9: Results of processing the same input data as in FIG. 7, within three separate offset windows. (A) Difference between input data and sequence of forward and inverse Radon transforms applied to the input data. (B, C, D) Data in the parabolic Radon transform domain for each of the three input data windows. (E, F, G) Weights used for the high-resolution radon transform for each of the three input data windows.

Note however, that each of the offset-range dependent transforms in FIG. 9 focuses the hyperbola at a slightly different location in the model space. The best fitting parabolas in each offset window have slightly different parameters (curvature and zero-offset time). This observation implies that mute functions used to separate events in the transform domain should also vary as a function of the offset range of the data used to compute the transform.

To manage the variations of mute parameters with offset we introduce the following approach. First, start with a mute function, $q(\tau, x=0)$, for the window including the zero offset. At a given zero-offset time $\tau$, denote by $q_0$ the corresponding mute position, $q_0 = q(\tau, x=0)$. The parameters $(\tau, q_0)$, define a parabola $t = \tau + q_0 x^2 / X_{max}^2$, as well as a hyperbola with same zero-offset time and zero-offset curvature as the parabola:

$$\theta^2 = \tau^2 + 2q_0 \tau x^2 / x_{max}^2 \quad \text{Equation (4).}$$

The relation for the mutes between offset windows is then:

$$q_{ref} = q_0 * \tau / \theta(\tau, x_{ref}) \quad \text{Equation (5),}$$

where $q_{ref}$ is the desired mute position for the window of data associated with offset $x_{ref}$, and for offset time $\tau$. The moveout parameter $q_{ref}$ is obtained by matching at location $x_{ref}$ the gradients of the parabola $(\tau, q_{ref})$ and of the hyperbola $(\tau, q_0)$ More generally, the procedure described above defines local signal-and-noise separation criteria, consistent with a global signal-and-noise separation criterion, and expressed in terms of a complex (for instance hyperbolic) mute function. A novel feature with respect to prior art is the use of a moveout trajectory (e.g. hyperbola) for the global signal-and-noise separation criterion, which is not part of the moveout trajectories used for the computation of the Radon transform (e.g. parabolas). This new feature adds flexibility and improved accuracy to the signal-and-noise separation, while retaining computational efficiency. In effect, the improved signal-and-noise separation can improve the separation of desirable features in the seismic data.

Efficient Implementation of the Signal-and-Noise Separation (muting) for the Transforms from Local Data Windows In another embodiment of this invention, the optimum time shift between the windows in the data domain (x–t) and in the Radon transform domain (q,τ) can be computed, as is shown in FIG. 8.

Consider the time-offset window defined by the time interval $[t_1, t_2]$ and the offset interval $[x_1, x_2]$ and suppose $x_{ref}$ is an appropriate reference offset for the window (typically the central offset). For a given q value, the zero-offset times of the parabolae which cross the reference offset within the window lie in the interval $[\tau_1, \tau_2]$ where $\tau_1 = t_1 - \Delta\tau(q)$ and $\tau_2 = t_2 - \Delta\tau(q)$ where $\Delta\tau(q) = q \, x_{ref}^2 / x_{max}^2$. It can be seen that the optimum window in $\tau$ is earlier (for positive q) than that in t by a time shift $\Delta\tau(q)$. Note that the time shift is linear in q and therefore a rectangular window in t–x is represented by a parallelogram in τ–q. When q and $x_{ref}$ are large, the time shift $\Delta\tau$ can be significantly longer than the window length in the time domain.

Since processing in the frequency domain implies that both the data and model are periodic with period $t_2 - t_1$, the model is effectively defined at all times and we simply select the Appropriate (parallelogram) window from this model, knowing the shift $\Delta\tau(q)$. In effect, the procedure described here allows to compute the transform efficiently using periodic boundary conditions, while applying the signal and noise separation as if the boundary conditions were zero values (a preferred description) outside of the input data interval $[t_1, t_2]$.

Synthetic and Field Data Examples

Figure 1B:
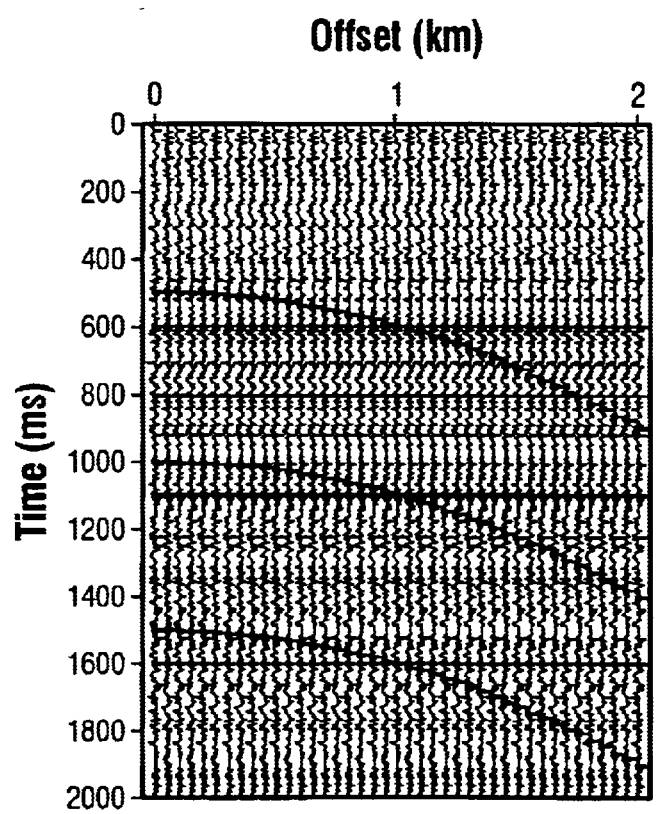
Figure 2A:
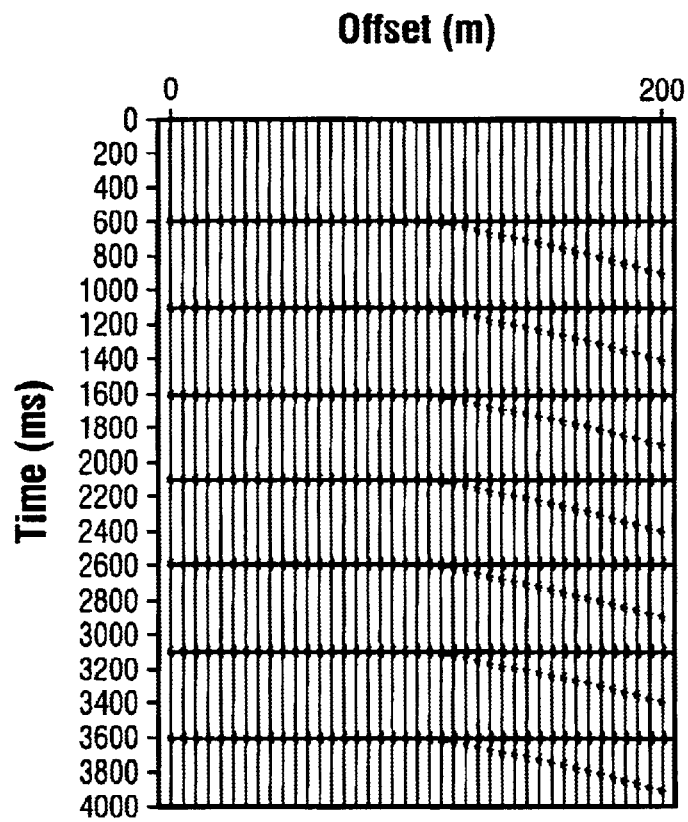
FIG. 2: Conventional Radon multiple attenuation applied to the noise free data of FIG. 1A. (A) Estimated primaries; (B) Estimated multiples; (C) Residual:difference between input data and sequence of forward and inverse Radon transforms applied to the input data; and (D) Radon domain.
Figure 2B:
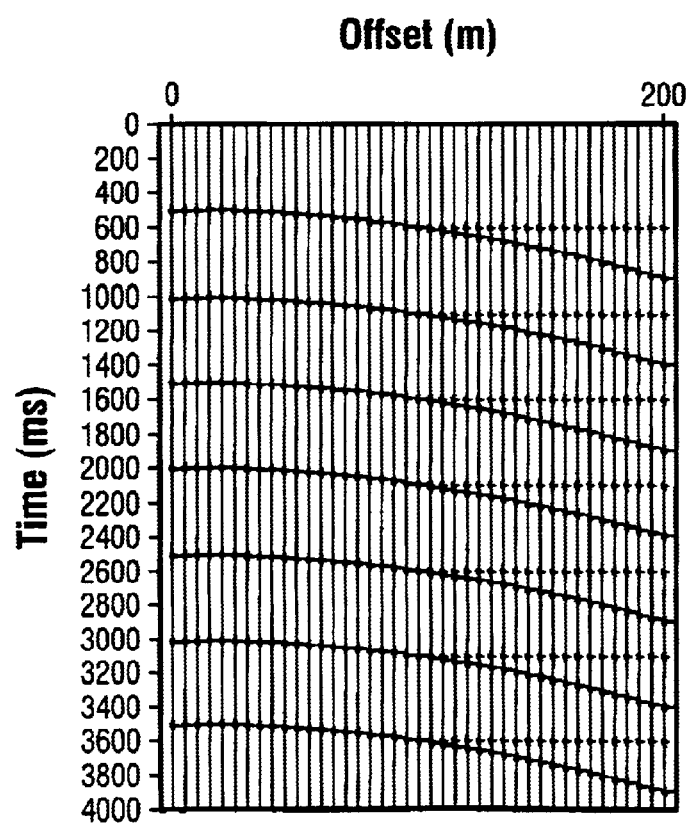
Figure 2C:
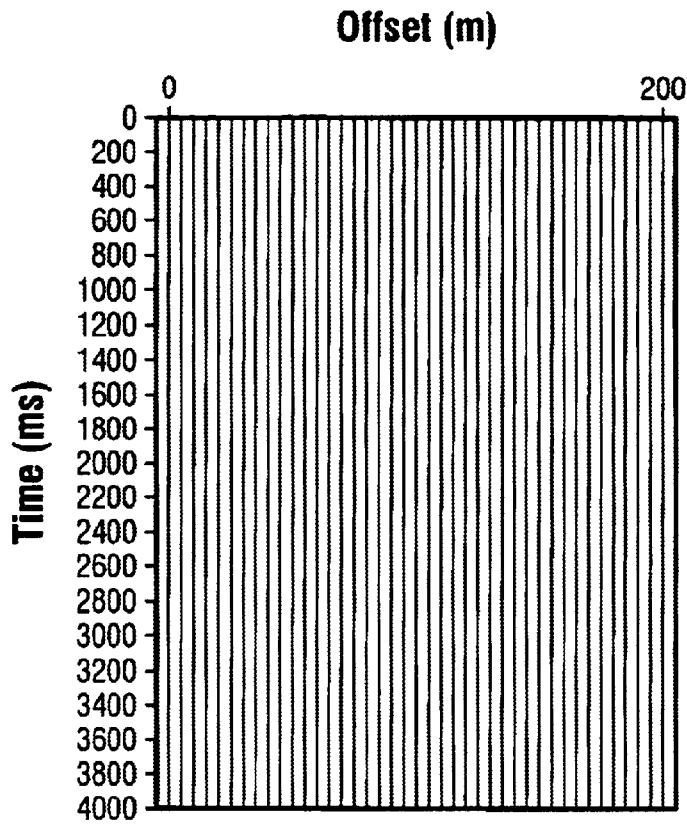
Figure 2D:
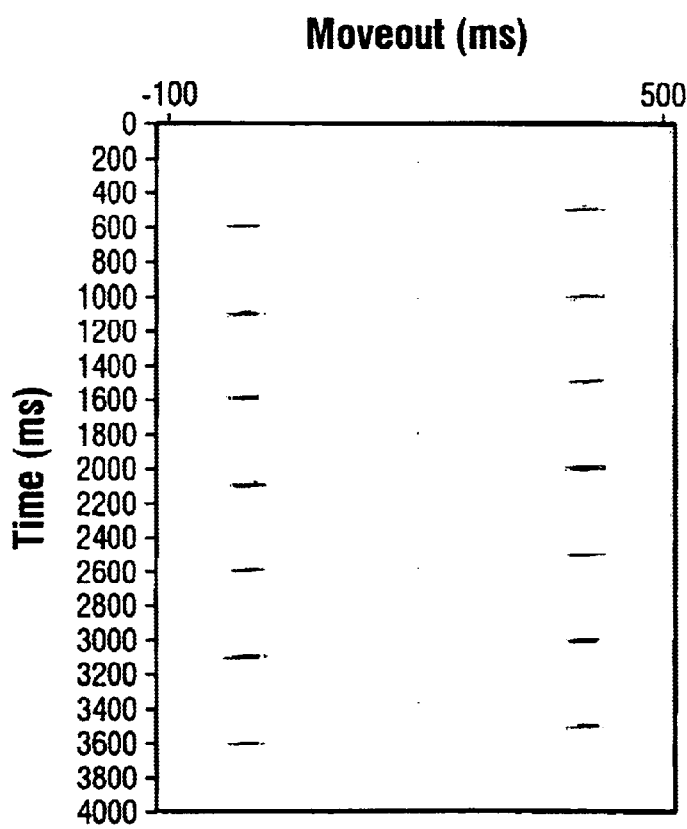
Figure 3A:
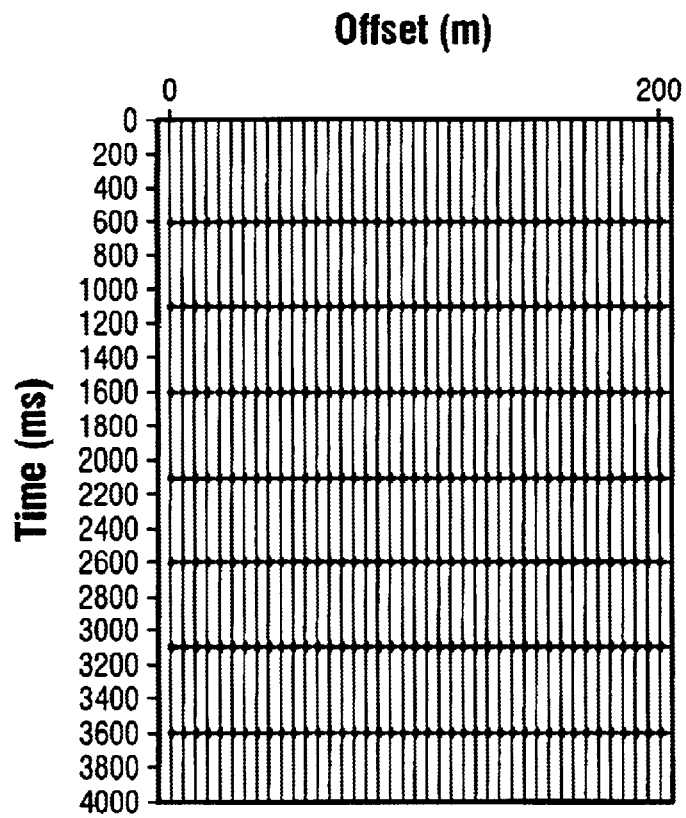
FIG. 3: Application to the noise free data of FIG. 1A of a high-resolution Radon multiple attenuation using the recursive method for derivation of weights. FIGS. (A) to (D) are as in FIG. 2; the last one is (E): Weights used for the high-resolution Radon transform. The weights are displayed as function of frequency (vertical axis) and moveout parameter (horizontal axis).
Figure 3B:
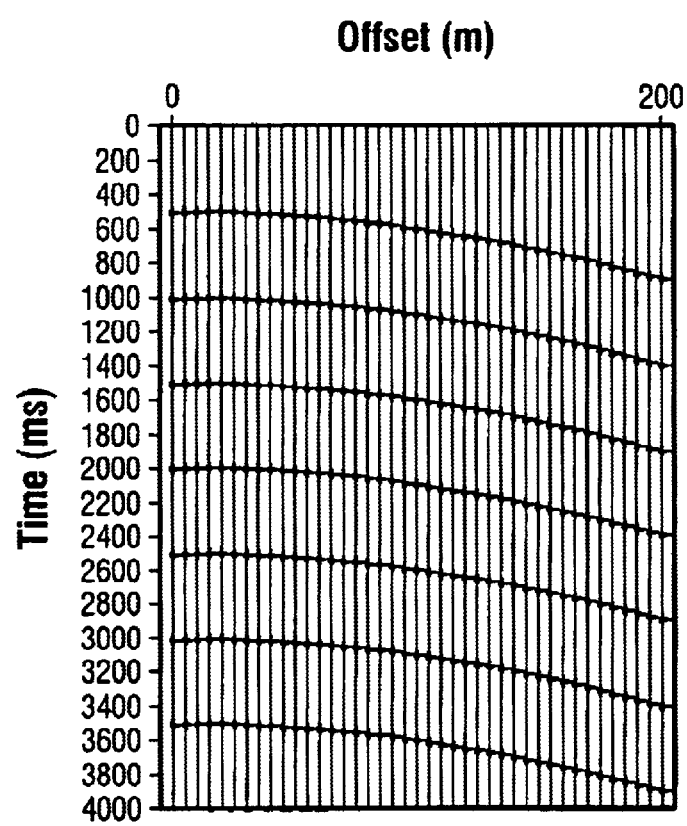
Figure 3C:
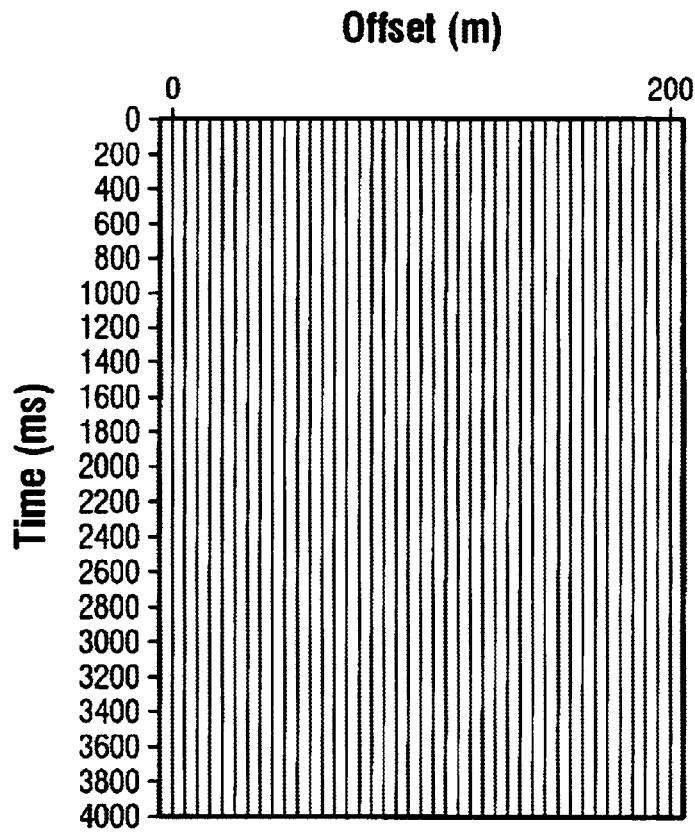
Figure 3D:
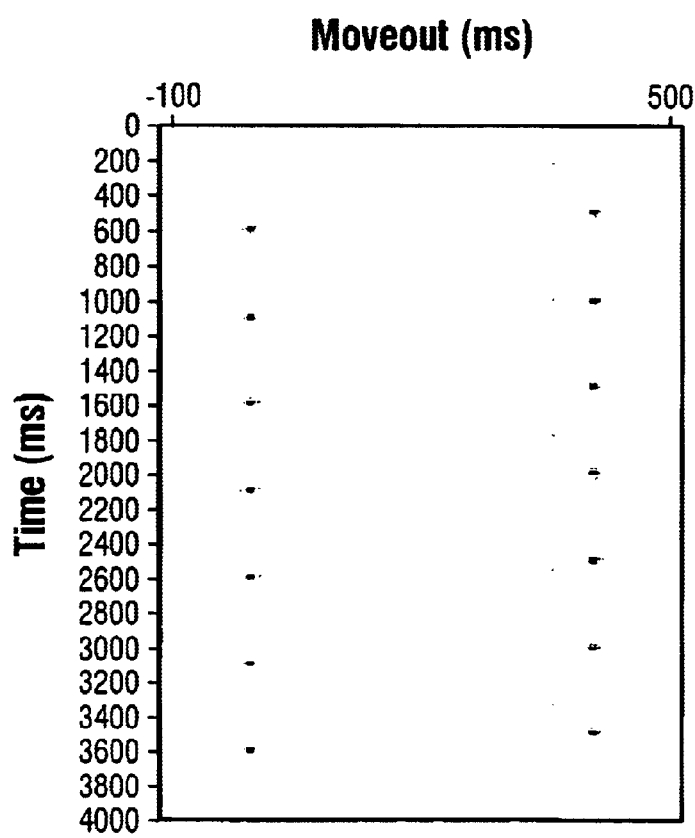
Figure 3E:
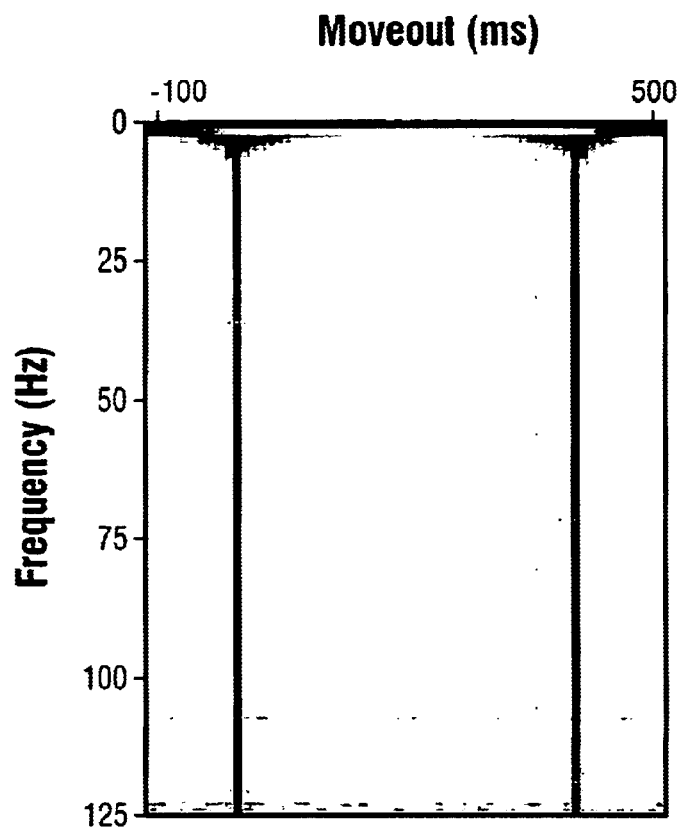

To illustrate the embodiments of this invention, synthetics from FIG. 1B (with added random noise) have been shown. The results are displayed in FIGS. 5A through 5E for the case of data with added noise. The semblance-based weights are derived in the frequency range from 70 Hz to 90 Hz, and are assumed to be constant over the entire frequency range. The separation of primaries and multiples is now improved due to more accurate weights. There are no high values at the edges of the transform domain.

Figure 4A:
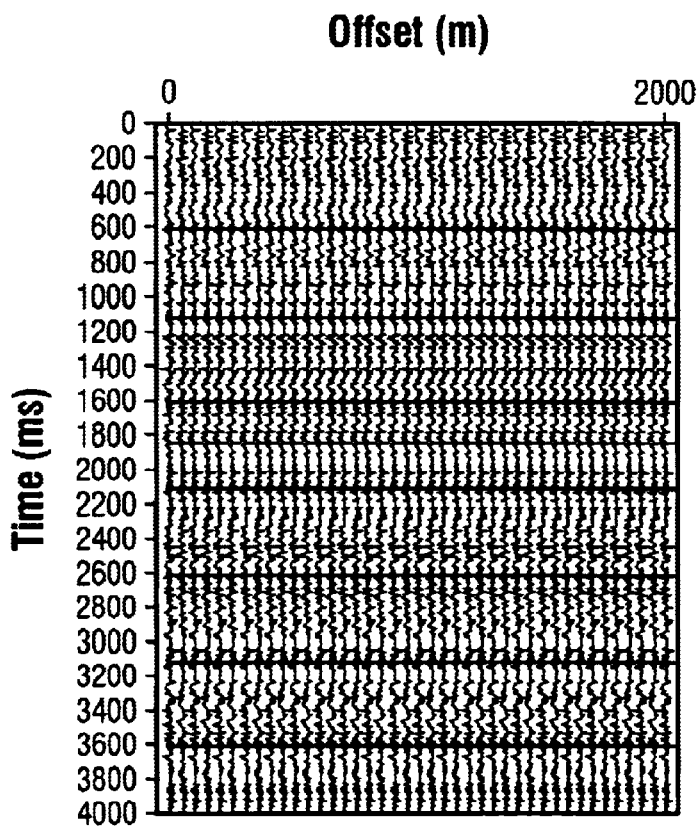
FIG. 4. As FIG. 3 but for the noisy synthetic data shown in FIG. 1B.
Figure 4B:
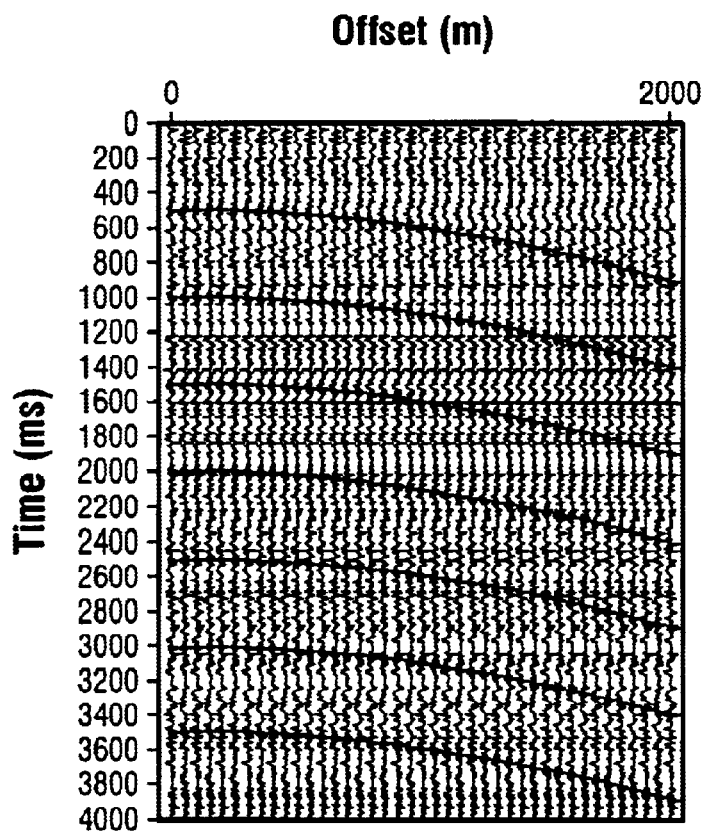
Figure 4C:
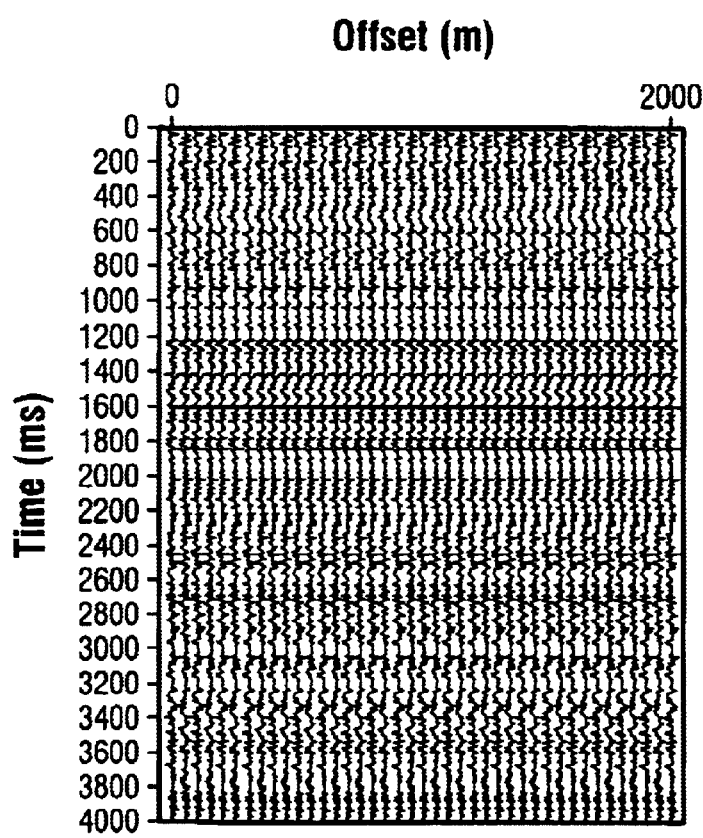
Figure 4D:
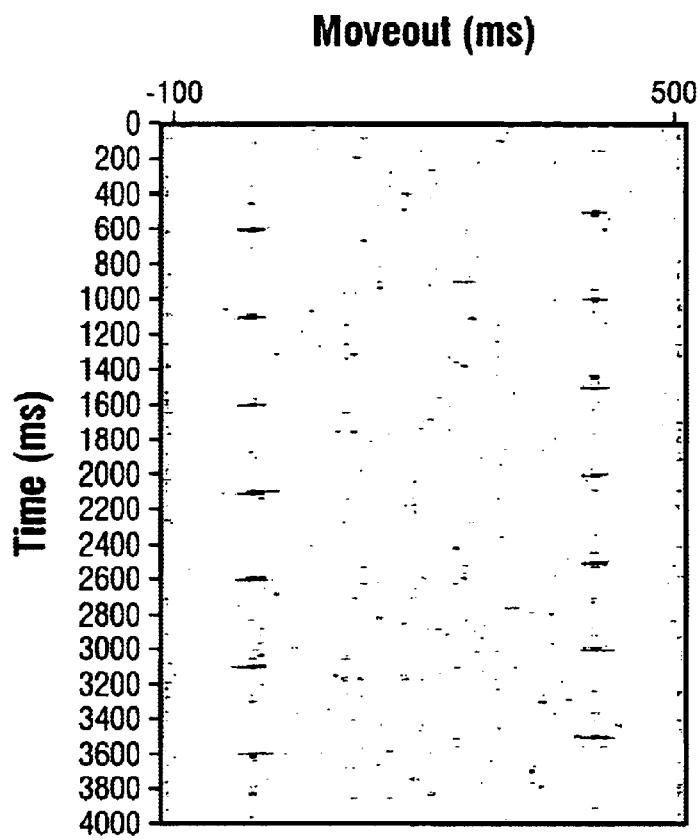
Figure 4E:
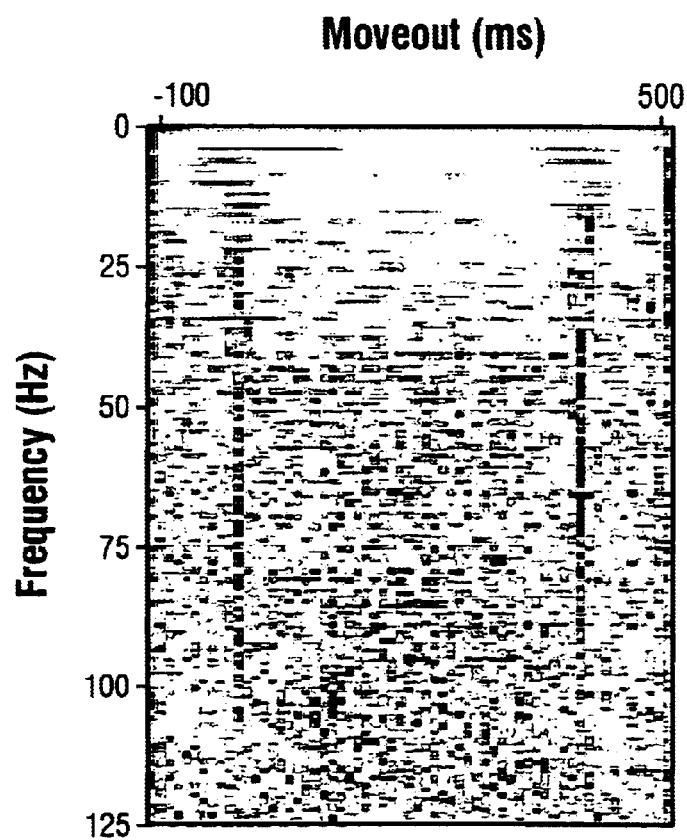
Figure 5A:
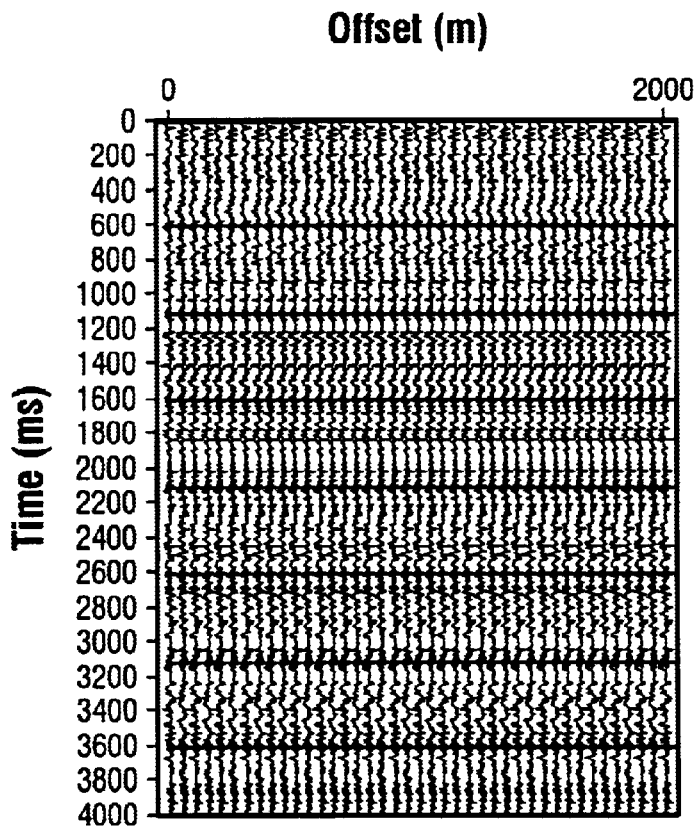
FIG. 5. As FIG. 3 but using semblance-derived weights.
Figure 5B:
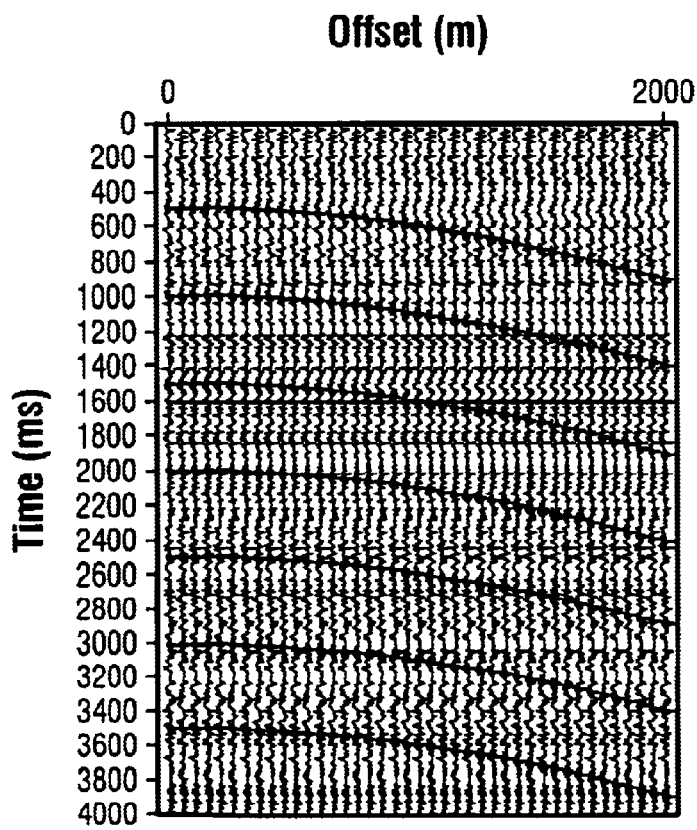
Figure 5C:
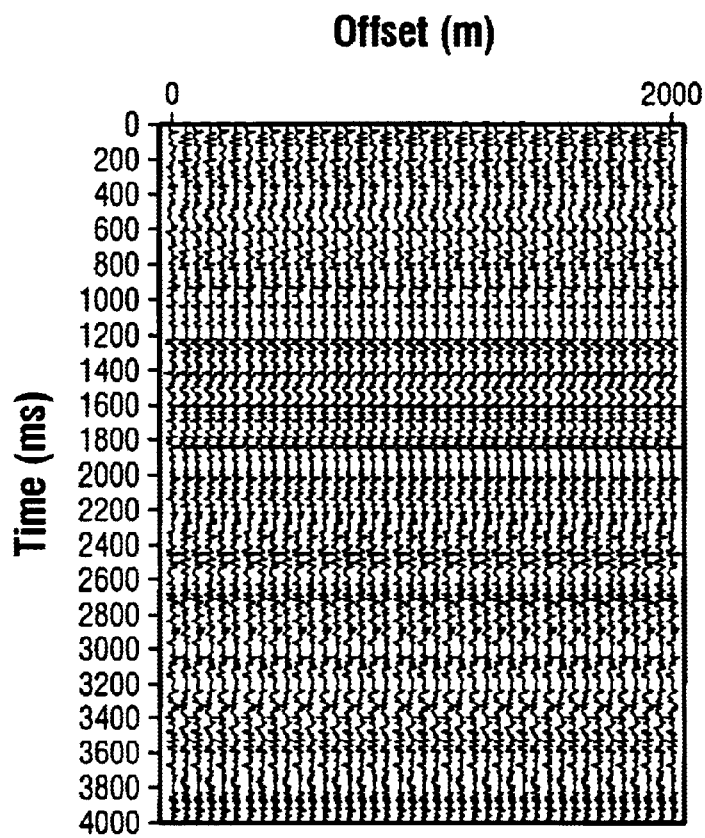
Figure 5D:
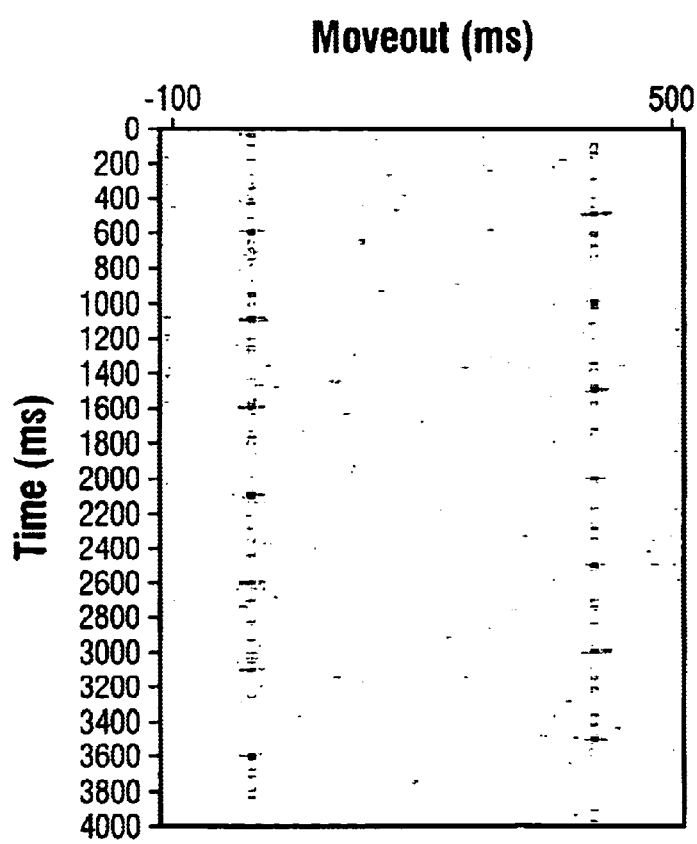
Figure 5E:
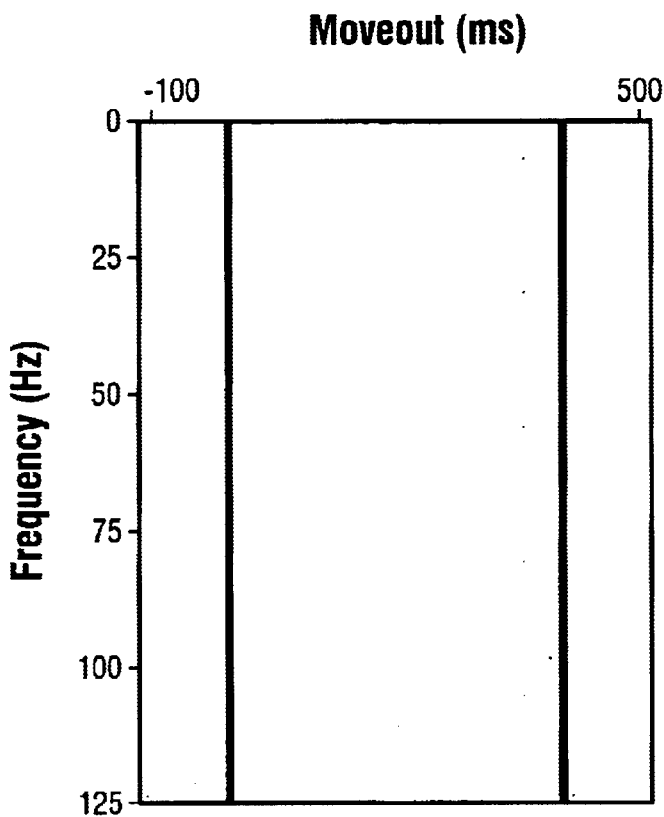
Figure 6A:
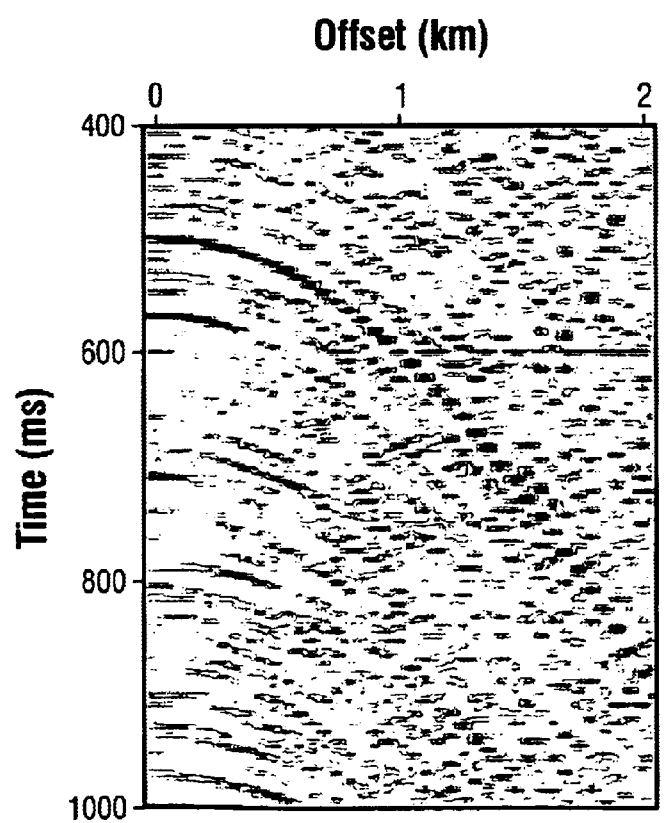
FIG. 6: Zoom on FIGS. 4B (left, recursive update of weights) and 5B (right, semblance-based weights).
Figure 6B:
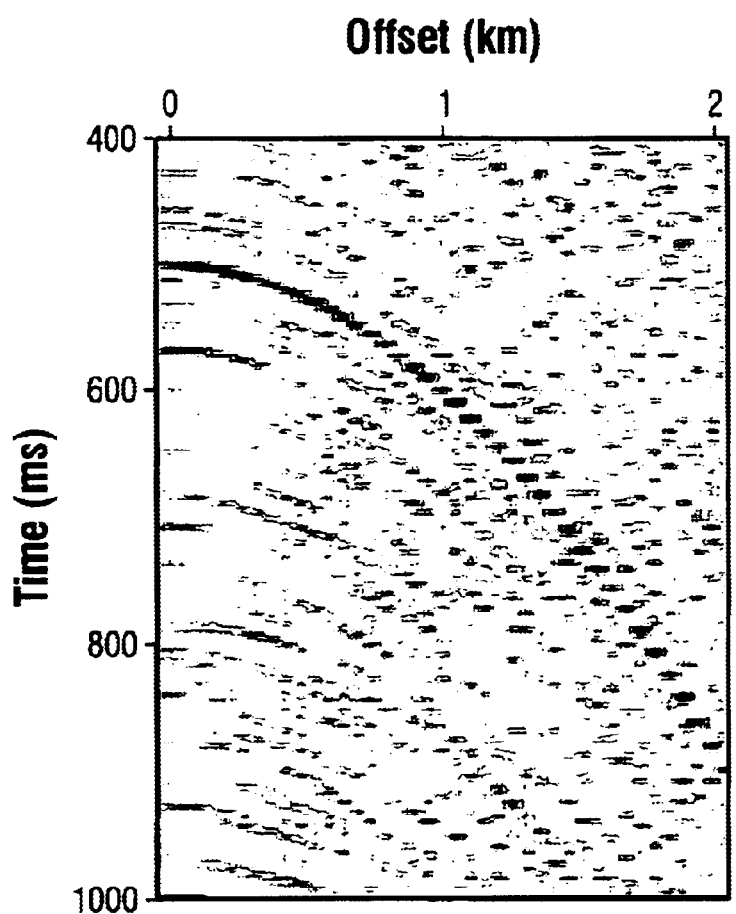

FIG. 6 is a larger scale display of the results in FIGS. 4B and 5B. It clearly illustrates the improved separation of primaries and multiples when using semblance-based weights (FIG. 6B) rather than recursively updated ones (FIG. 6A).

The field data for this example is a CMP gather (FIG. 10A), with 100 m trace spacing and about 6 km maximum offset. Results from a conventional Radon transform (FIGS. 10B through 10F) illustrate the usual problems encountered: poor focusing in the transform domain, significant energy at the edges of the transform domain, aliasing artifacts in the transform and in the data domains.

Figures 10A, 10B, 10C, 10D, 10E, 10F:
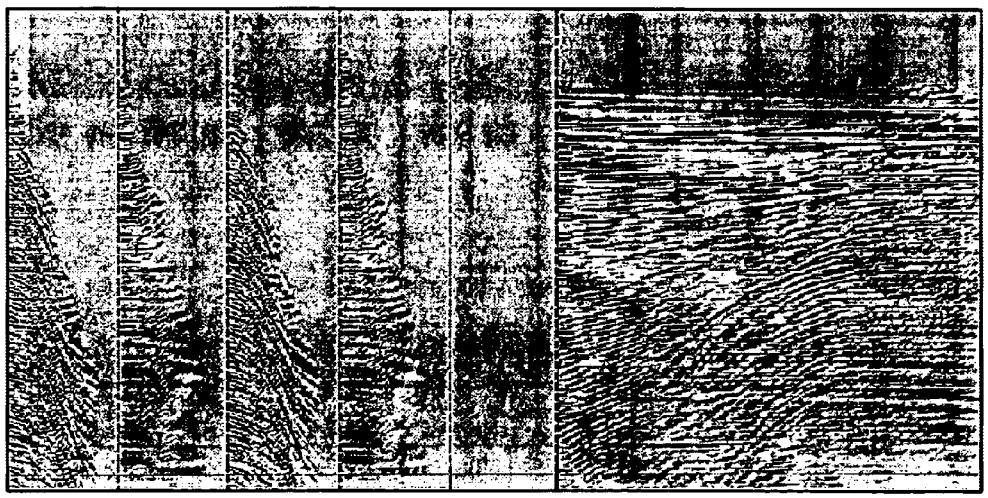
FIG. 10: Field data example, processing with conventional Radon transform. (A) Input data. (B) Estimated primaries. (C) Estimated multiples. (D) Input data minus estimated primaries. (E) Residual of the forward and inverse transforms: Input data minus sum of estimated primaries and multiples. (F) Data in the parabolic Radon transform domain.
Figures 11A, 11B, 11C, 11D, 11E, 11F:
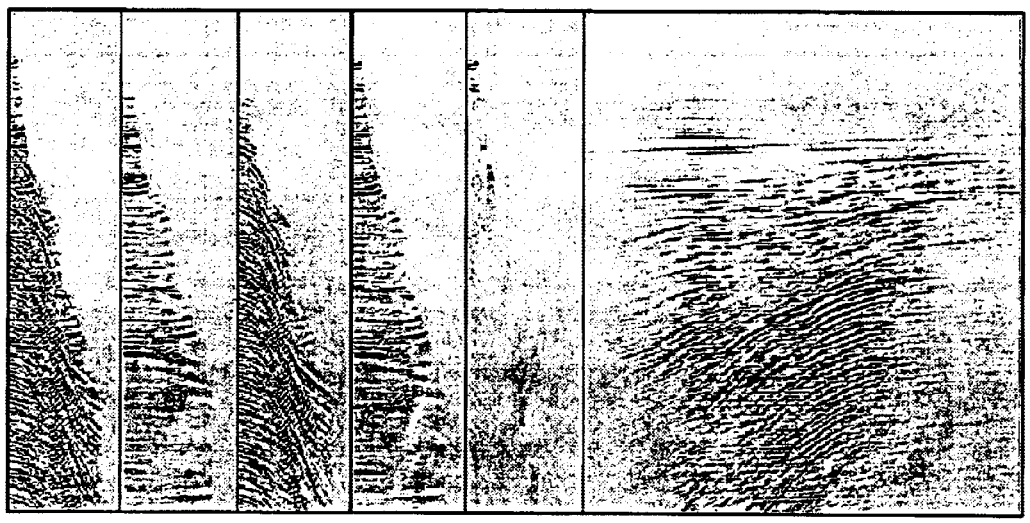
FIG. 11: Field data example, as in FIG. 10, where the weights are computed recursively.
Figures 12A, 12B, 12C, 12D, 12E, 12F:
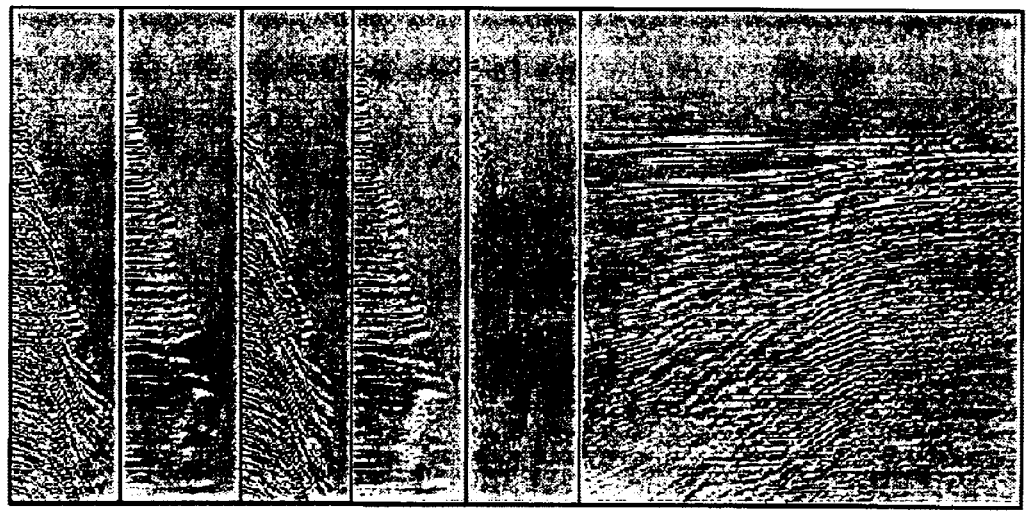
FIG. 12: Field data example, as in FIG. 10, with semblance-based weights.

The results from the present invention are displayed in FIGS. 12B through 12F. The corresponding semblance-based weights are shown in FIG. 13A. As expected, aliased and transform artifacts are reduced and the estimated primary events (FIG. 12B) are improved in comparison with the result from the conventional Radon transform (FIG. 10B).

The results for a high-resolution Radon transform using the recursive updating of weights are displayed in FIGS. 11A through 11F, with corresponding weights shown in. FIG. 13B. These results are not as good as the ones obtained with the semblance-based weights. This is particularly apparent in FIGS. 11F (transform domain) and 11B (estimated primaries) where some aliased energy and artifacts at the edges of the transform domain are now visible again, and can be related to sub-optimal weights estimated by the recursive scheme (FIG. 13B).

A number of embodiments of the present invention have been described. Nevertheless, it will be understood that various modifications may be made without departing from the spirit and scope of the invention. Accordingly, other embodiments are within the scope of the following claims.

What is claimed is:

1. A method of processing seismic data comprising:
   defining a high-resolution Radon transform for use on seismic data, comprising regularizing the high-resolution Radon transform using a semblance measure of the seismic data; and
   processing the seismic data using the high-resolution Radon transform to enhance desirable features of the seismic data; and providing a tangible representation of the processed seismic data.

2. The method of claim 1, wherein the semblance measure of the seismic data comprises a semblance measure along a dimension of the seismic data.

3. The method of claim 1, wherein the seismic data is divided into a two-dimensional array comprising one dimension selected from the group consisting of time and depth, and a second dimension selected from the group consisting of a spatial surface position and an angle.

4. The method of claim 1, wherein the seismic data is divided into a multi-dimensional array comprising one dimension selected from the group consisting of time and depth, and a plurality of dimensions selected from the group consisting of spatial surface positions and angles.

5. The method of claim 1, wherein the processing of the seismic data further comprises:
performing the high-resolution Radon transform on the seismic data using the semblance measure of the seismic data;
separating a first region and a second region in the Radon transformed seismic data; and
performing an inverse of the high-resolution Radon transform on the separated, Radon transformed seismic data.

6. The method of claim 4, wherein the first region is a signal region and the second region is a noise region.

7. The method of claim 2, wherein the dimension of the seismic data comprises a plurality of dimensions of the seismic data.

8. The method of claim 2, wherein the dimension of the seismic data comprises a frequency domain.

9. The method of claim 1, wherein the processing the seismic data using the high-resolution Radon transform to enhance desirable features of the seismic data further comprises:
approximating a complex moveout trajectory by a plurality of segments;
dividing the seismic data into a plurality of local windows of data consistent with the plurality of segments; and
performing a high-resolution Radon transform on each of the local windows of data to enhance the desirable features of the seismic data consistent with the plurality of segments.

10. The method of claim 9, wherein performing the high-resolution Radon transform on each of the local windows of data further comprises the steps of computing the transform with periodic boundary conditions and applying the signal-and-noise separation consistent with zero-value boundary conditions by using the known timeshifts between components of the model.

11. The method of claim 1, wherein the regularizing the high-resolution Radon transform using a semblance measure of the seismic data further comprises computing a regularization matrix comprising applying a phase shift determined by a moveout trajectory to the seismic data.

12. The method of claim 1, wherein regularizing the high-resolution Radon transform using a semblance measure of the seismic data further comprises normalizing the stack power along the moveout trajectory to obtain a semblance measure.

13. The method of claim 1, wherein regularizing the high-resolution Radon transform using a semblance measure of the seismic data further comprises sharpening the semblance measure.

14. The method of claim 1, wherein regularizing the high-resolution Radon transform using the semblance measure of the seismic data further comprises smoothing the semblance measure over a second dimension of the seismic data.

15. The method of claim 14, wherein the second dimension of the seismic data comprises a dimension selected from a spatial position and an angle.

16. A method for processing seismic data comprising:
defining a high-resolution Radon transform for use on seismic data, comprising regularizing the high-resolution Radon transform using a semblance measure along a dimension of the seismic data, wherein the dimension of the seismic data comprises a frequency domain;
processing the seismic data using the high-resolution Radon transform to enhance desirable features of the seismic data, wherein the processing the seismic data comprises:
performing the high-resolution Radon transform on the seismic data using the semblance;
separating a signal region and a noise region in the Radon transformed seismic data; and
performing an inverse of the high-resolution Radon transform on the separated, Radon transformed seismic data; and
providing a tangible representation of the processed seismic data.

17. A computer system for processing seismic data comprising:
a computer, wherein the computer comprises a memory and a processor; and
executable software residing in the computer memory wherein the software is operative with the processor to:
define a high-resolution Radon transform for use on seismic data, comprising regularizing the high-resolution Radon transform using a semblance measure of the seismic data; and
process the seismic data using the high-resolution Radon transform to enhance desirable features of the seismic data.

18. The computer system of claim 17, wherein the process the seismic data using the high-resolution Radon transform further comprises:
perfonm the high-resolution Radon transform on the seismic data using the semblance measure of the seismic data;
separate a first region and a second region in the Radon transformed seismic data; and
perform an inverse of the high-resolution Radon transform on the separated, Radon transformed seismic data.

19. The computer system of claim 17, wherein the process the seismic data using the high-resolution Radon transform further comprises:
approximate a complex moveout trajectory by a plurality of segments;
divide the seismic data into a plurality of local windows of data consistent with the plurality of segments; and
perform a high-resolution Radon transform on each of the local windows of data to enhance the desirable features of the seismic data consistent with the plurality of segments.

20. A computer system for processing seismic data comprising:
a computer, wherein the computer comprises a memory and a processor; and
means for processing seismic data on the computer using a high-resolution Radon transform and a semblance measure of the seismic data to enhance desirable features of the seismic data.

* * * * *